US010528027B2

United States Patent
Künzel et al.

(10) Patent No.: US 10,528,027 B2
(45) Date of Patent: Jan. 7, 2020

(54) ATTENUATION OF LOAD OSCILLATIONS WITHOUT ADDITIONAL MEASURING MEANS ON THE LOAD SIDE

(71) Applicant: SIEMENS AKTIENGESELLSCHAFT, München (DE)

(72) Inventors: Stefan Künzel, Erlangen (DE); Carsten Hamm, Eggolsheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/760,924

(22) PCT Filed: Aug. 31, 2016

(86) PCT No.: PCT/EP2016/070486
§ 371 (c)(1),
(2) Date: Mar. 16, 2018

(87) PCT Pub. No.: WO2017/045920
PCT Pub. Date: Mar. 23, 2017

(65) Prior Publication Data
US 2018/0259933 A1  Sep. 13, 2018

(30) Foreign Application Priority Data

Sep. 17, 2015  (EP) .................................. 15185655

(51) Int. Cl.
*G05B 19/404* (2006.01)
*B62D 5/04* (2006.01)
(Continued)

(52) U.S. Cl.
CPC ......... *G05B 19/404* (2013.01); *B62D 5/0472* (2013.01); *F16F 15/002* (2013.01);
(Continued)

(58) Field of Classification Search
CPC .................. G05B 19/404; G05B 19/19; G05B 2219/49054; G05B 2219/49048;
(Continued)

(56) References Cited

U.S. PATENT DOCUMENTS 6,903,529 B2   6/2005   Künzel et al.
6,982,536 B2   1/2006   Geissdorfer et al.
(Continued)

FOREIGN PATENT DOCUMENTS

DE      10137496 A1    10/2002
DE      10246093 01    11/2003
(Continued)

OTHER PUBLICATIONS

Controltechniques (advanced position control user guide [online] retrieved from URL https://www.nidec-netherlands.nl/media/2136-frequentieregelaars-unidrive-sp-advanced-position-controller-user-guide-en-iss6-0471-0034-06.pdf , Nov. 29, 2010, dated retrieved Feb. 19, 2019) (Year: 2010).*
(Continued)

*Primary Examiner* — James J Lee
*Assistant Examiner* — Shon G Foley
(74) *Attorney, Agent, or Firm* — Henry M. Feiereisen LLC

(57) ABSTRACT

A method for attenuating load oscillations in a load mechanism having a controlled drive, wherein a load is coupled mechanically to a motor via a spring element, includes determining an actual motor torque value, determining an actual angular velocity value, determining a motor inertial torque, calculating a spring torque from the actual angular velocity value, the motor inertial torque and the actual motor torque value, and supplying the calculated spring torque to an attenuator connection for attenuating the load oscillations.

18 Claims, 5 Drawing Sheets

(51) Int. Cl.
*F16F 15/00* (2006.01)
*G05B 19/19* (2006.01)

(52) U.S. Cl.
CPC .... *G05B 19/19* (2013.01); *G05B 2219/49048* (2013.01); *G05B 2219/49054* (2013.01)

(58) Field of Classification Search
CPC ......... G05B 2219/39188; F16F 15/002; B62D 5/0463; B62D 5/0472; B60L 2240/423; B60L 15/20; Y02T 10/642; B25J 13/085
See application file for complete search history.

(56) References Cited

U.S. PATENT DOCUMENTS

| | | | |
|---|---|---|---|
| 7,024,332 | B2 | 4/2006 | Künzel et al. |
| 7,047,150 | B2 | 5/2006 | Künzel et al. |
| 7,236,913 | B2 | 6/2007 | Hamm et al. |
| 7,299,108 | B2 | 11/2007 | Geissdoerfer et al. |
| 8,729,845 | B2 | 5/2014 | Künzel et al. |
| 8,909,371 | B2 | 12/2014 | Hamm |
| 8,978,503 | B2 | 3/2015 | Dort et al. |
| 9,146,166 | B2 | 9/2015 | Köpken et al. |
| 9,555,546 | B2 | 1/2017 | Hamm et al. |
| 9,712,095 | B2 | 7/2017 | Bönke et al. |
| 9,859,870 | B2 | 1/2018 | Geissdoerfer et al. |
| 2004/0135535 | A1 | 7/2004 | Kunzel |
| 2005/0200328 | A1 | 9/2005 | Edson |
| 2006/0196711 | A1 | 9/2006 | Endo |
| 2009/0066360 | A1 | 3/2009 | Künzel |
| 2013/0160143 | A1 | 6/2013 | Hamm et al. |
| 2015/0355647 | A1 | 12/2015 | Bitterolf et al. |

FOREIGN PATENT DOCUMENTS

| | | |
|---|---|---|
| DE | 10340400 A1 | 4/2005 |
| JP | 2008228360 A | 9/2008 |
| JP | 2015023623 A | 2/2015 |

OTHER PUBLICATIONS

Univeristy of Guelph (Torque and Angular Accelration [online] retrieved from URL https://web.archive.org/web/20080701080751/https://www.physics.uoguelph.ca/tutorials/torque/Q.torque.intro.angacc.htra, Jul. 1, 2008. date retrieved Feb. 19, 2019 (Year: 2008).*
Translation of JP 2015023623 A, Komatsu Hiroyuki (Year: 2015).*
Translation of DE 10340440 A1, Kuenzel Stefan (Year: 2005).*
Tomisaki, Hidenori, et al., "anti-vibration control for industrial robots using state observer", yaskawa techical review, 1994, vol. 58, No. 3; 1994.

* cited by examiner

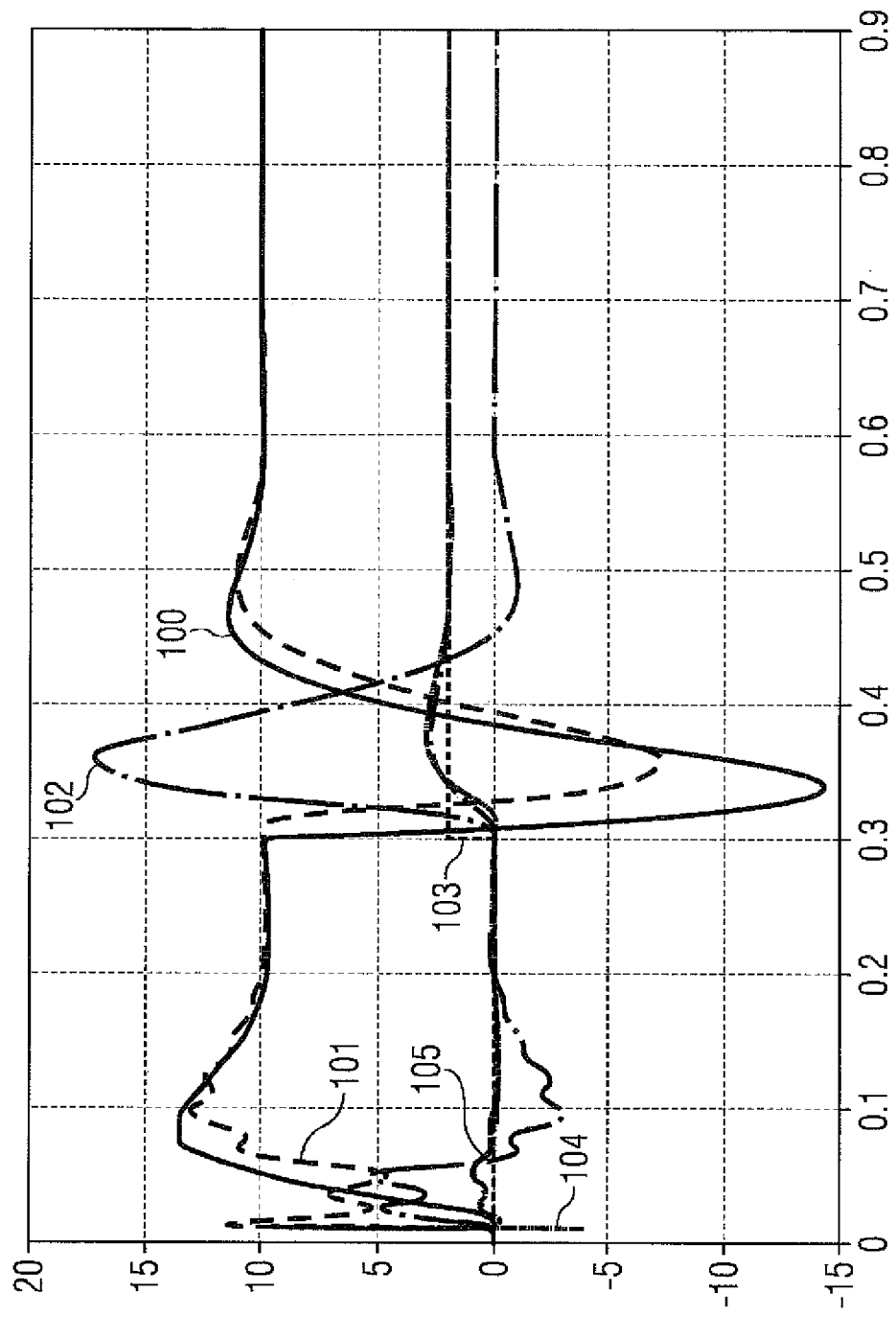

ATTENUATION OF LOAD OSCILLATIONS WITHOUT ADDITIONAL MEASURING MEANS ON THE LOAD SIDE

CROSS-REFERENCES TO RELATED APPLICATIONS

This application is the U.S. National Stage of International Application No. PCT/EP2016/070486 filed Aug. 31, 2016, which designated the United States and has been published as International Publication No. WO 2017/045920 and which claims the priority of European Patent Application, Serial No. 15185655.6, filed Sep. 17, 2015, pursuant to 35 U.S.C. 119(a)-(d).

BACKGROUND OF THE INVENTION

The invention relates to a method and to a device that is especially suitable for carrying out the method, for attenuation of load oscillations in a load mechanism with a controlled drive, in which a load is coupled mechanically to a motor via a spring element.

In drive control a load 2 is frequently moved via a shaft 4 by a controlled drive, consisting of a final control element, for example a power converter, and a motor 6. Such a drive configuration is shown in greater detail in FIG. 1. A further drive configuration is illustrated schematically in FIG. 2. In this further drive configuration the load 2 is moved via a transmission 8 by the motor 6 of a controlled drive. In this case it makes no difference whether a linear or a rotational movement of the motor 6 or the load 2 are involved and whether the transmission 8 converts a rotational movement into a linear movement or vice versa, whether a rotational movement is converted into another rotational movement or a linear movement is converted into another linear movement.

FIG. 3 shows a block diagram of a control path for a dominant natural frequency in greater detail. In this block diagram a current controller is identified by the number 10, a first integrator by the number 12, a second integrator by the number 14, a third integrator by the number 16, a fourth integrator by the number 18 and a subtractor by the number 20 and an adder by the number 22. The current controller 10 is supplied with a motor torque required value $M_{soll}$. The subtractor 20 is arranged between the current controller 10 and the first integrator 12. At the output of this first integrator an angular velocity actual value $\omega_{Mist}$ or the motor speed actual value is present, which is supplied to the second integrator 14. On the output side of this second integrator an angular actual value $\Phi_{Mist}$ or motor position actual value is present, which is supplied to a first input of the adder 22. The inverting input of this adder 22 is connected to the output of the fourth integrator, which is linked on its input side to an output of the third integrator 16. A load speed actual value $\omega_{List}$ is present at the output of the third integrator, while a load position actual value $\Phi_{List}$ is present at the output of the fourth integrator 18. These two integrators 12 and 14 form a motor mechanism 24, while the two integrators 16 and 18 exemplify a load mechanism 26. The motor mechanism 24 and the load mechanism 26 are coupled to one another by means of a shaft 4 or a transmission 8. In terms of control technology this mechanical coupling is exemplified by a spring component 28, of which the proportionality factor corresponds to the elasticity of the shaft 4 or of the transmission 8. The load position actual value $\Phi_{List}$ present at the output of the fourth integrator 18 is connected to the adder 22 as negative feedback. The spring torque $M_F$ of the spring component 28 is switched to the subtractor 20 at which the motor torque actual value $M_{ist}$ is present. Moreover the spring torque $M_F$ is switched by means of a further adder 29 to a load torque $M_L$.

Under particular circumstances of motor and load inertia and the elasticity of the shaft 4 or of the transmission 8, low-frequency oscillations, which are also referred to as load oscillations, arise between motor 6 and load 2. These load oscillations are frequently very disruptive and are difficult to manage with control technology.

By way of illustration the remarks given below are restricted to rotational movements, however the observations also relate in the same way to linear movements or to a mixture of linear and rotational movements.

State controllers are frequently used, in systems that are capable of oscillation, to attenuate such load oscillations. These controllers are however frequently so complex that it is only possible for them to be used by academic closed-loop control specialists. Such state controllers therefore appear unsuitable for a broad product solution, above all in respect of simple commissioning. If such automatic commissioning is unsuccessful manual intervention is only then possible by specialists. One problem in commissioning a state controller is that a number of feedbacks have to be adjusted simultaneously, since the feedbacks influence each other. This problem also occurs in principle when values to be connected to the torque are created, since a torque controller partly regulates away the value connected again and thus influences it. This could be prevented if the motor speed controller is adjusted slowly, however it would then be necessary to put up with a slow and less rigid controller. A good fault behavior is thus hardly successful. In technical literature the 'virtual sensor' is often propagated, which with a controlled model of the path capable of oscillation is to create the missing measurement variable. These approaches are complex and less robust in relation to path changes.

Another known solution uses a differential speed and differential position feedback to the angular velocity required value of the motor 6. Moreover a higher-ranking motor speed controller also delivers an angular velocity required value, which is added to the differential speed and the differential position feedback. Thereby a similar complex structure is obtained to that of the classic state controller, which is difficult to adjust. Since the motor speed controller in part compensates for the feedback values, the adjustment of the motor speed controller generally heavily influences the effect of the connection.

One way out could be to control the load speed directly without a motor speed controller. But this too is problematic, since the control path here has three poles at the stability edge and does not have any zero point, which makes a stable control possible only in a narrow band. For information only it should be pointed out here that a further pole at the stability edge is added by an I portion of the controller. This makes commissioning difficult.

At present there are no measures for active attenuation of load oscillations without load measurement. If no measures for active attenuation of load oscillations are employed, then an excitation of oscillation must be avoided by movement management. The consequence of this is that movement processes last comparatively long and that only a low control rigidity can be achieved. Faults can then excite oscillations that are not actively attenuated. There are in fact required value filters, which must be applied for all variables of the predetermined track, in order to avoid the excitation of the oscillation by required value changes. An excitation by a load torque change/fault will not be attenuated by these however.

An active attenuation of weakly attenuated natural frequencies by micro actuators can for example be carried out by a method that is described in German patent 102 46 093 C1 and is also known by the name of APC (Advanced Position Control). In some cases however active attenuation is not possible or is only possible with great difficulty.

The publication DE 101 37 496 A1 discloses a method and a control structure for attenuation of low-frequency load oscillations for drives with motor and load. A division of the controller cascades and an attenuation of the oscillation are undertaken only in the load speed controller. In this case it is not the motor torque, but a motor speed required value of a rapidly controlled motor speed controller that is selected as the connection point for a load acceleration.

The publication DE 103 40 400 A1 further discloses a method for attenuation of low-frequency load oscillations in a controlled drive, in which a load is coupled mechanically to a motor. From a signal of a speed control circuit of the controlled drive a natural frequency signal with a natural frequency of at least one low-frequency load oscillation to be attenuated is established. In addition this natural frequency signal is amplified as a function of a predetermined degree of attenuation and this amplified signal is applied as feedback to a predetermined motor speed required value. Thus a method is obtained for attenuating low-frequency load oscillations, which is no longer reliant on signals of the load circuit and which is an integral component of a drive controller of a controlled drive.

SUMMARY OF THE INVENTION

The object of the present invention is therefore to find an option for attenuating low-frequency load oscillations for drives with motor and load, which with good control results also makes simple commissioning possible.

The object in relation to the method is achieved by the specification of a method for attenuation of load oscillations in a load mechanism with a controlled drive, in which a load is coupled mechanically to a motor via a spring element, with the steps:
  Establishing at least one angular velocity actual value,
  Establishing a motor inertial torque,
  Establishing a motor torque value, in particular a motor torque actual value,
  Calculating a spring torque from the angular velocity actual value, the motor inertial torque and also the motor torque value, in particular the motor torque actual value,
  Supplying the spring torque to an attenuation connection for attenuating the load oscillations.

The object in relation to the device is achieved by the specification of a device for attenuation of load oscillations in a load mechanism with a controlled drive, in which a load is coupled mechanically to a motor via a spring element, wherein there is provision for the establishment of at least one angular velocity actual value and also of a motor torque value, in particular of a motor torque actual value, and a determination of a motor inertial torque, and wherein there is subsequently provision for a calculation of the spring torque from the angular velocity actual value, the motor inertial torque and also the motor torque value, in particular the motor torque actual value, as a well as for a supply of this spring torque to an attenuator connection for attenuating the load oscillations.

In particular the device is suitable for carrying out the inventive method.

It has been recognized that the spring torque thus represents one of two components that lead to load acceleration. The spring torque namely contains the portion of the load acceleration that leads to oscillation, while the portion of the load torque is normally independent of the oscillation. This enables the spring torque to be employed for load oscillation attenuation. Only the motor torque value, the angular velocity actual value and the motor inertial torque are necessary as input variables, which are usually known or are available as calculated variables or as measured variables.

The invention enables the acceleration that arouses the load oscillation to be isolated. This enables said value to be employed for the attenuation in the same way as the actual values on the load side. The available infrastructure for oscillation attenuation can then be used with little additional effort.

The advantage of this solution is that load oscillations can be attenuated without additional measurement devices having to be operated. Moreover this solution is more robust by comparison with other solutions, because it only accesses available measurement variables and the invariable motor inertial torque. The load properties (spring stiffness, load inertia) no longer have a role to play. Naturally the path influences the natural frequency and thus also the optimum setting of the feedback amplification, but robust settings can be chosen here, since the attenuation effect is maintained even with a non-optimum setting. The method/device can be integrated with just a few adaptations into the previous structure of other known attenuation methods, whereby the known setting specifications can be applied.

It is to be noted that the motor inertial torque merely has to be determined. This can also be done for example by looking up the specifications in the operating manual etc., since many motor manufacturers specify the motor inertial torque.

The motor torque value, in particular the motor torque actual value, can either come from the model as an actual value here or can also be a required value. The latter is the case in particular when the controller makes the adjustment quickly enough and the difference does not play any great role. If necessary the motor speed required value can also be included in the motor speed actual value.

Further advantageous measures are listed in the dependent claims, which can be combined with one another in any given way in order to achieve further advantages.

Preferably at least the angular actual value is first established by a sensor and/or by a measurement system, wherein the angular velocity actual value is established from said value. The invention can advantageously be adapted to the previously known methods, e.g. the APC system for oscillation attenuation, since these work with a sensor/measurement system on the load side. This sensor then creates the load speed or the load acceleration, which is then fed back to the angular speed required value. The invention can then be integrated into the existing infrastructure for oscillation attenuation with little additional effort.

In a preferred embodiment a first intermediate value is established by applying the first order differentiation according to time to the angular velocity actual value and application, in particular multiplication by the motor inertial torque. In this case it should be noted that the motor inertial torque is a constant. Therefore the first order differentiation according to time can be applied to the angular velocity after or before it has been multiplied by the motor inertial torque.

In a preferred embodiment the load mechanism also comprises a motor model with current controller, which is connected upstream of the controlled drive and from which the motor torque value, in particular the motor torque actual value, is determined. Normally the motor torque value, in particular the motor torque actual value, will be determined from the measured current and the motor model. This can also have been created with a generatorless motor model so that a motor generator is simply not absolutely necessary. Naturally fewer dynamic model actual values can be used just for attenuation for corresponding lower frequencies.

Preferably the motor torque value, in particular the motor torque actual value, is supplied for filtering, in particular for smoothing, i.e. to a filter with smoothing function, for forming a second intermediate value. The spring torque is created smoothed here, because a smoothing is sensible for differentiation, in order to remove the noise.

In a further preferred exemplary embodiment the first intermediate value and the second intermediate value are supplied to a subtractor for calculating the spring torque. In this case the spring torque is produced by subtracting the first intermediate value from the second intermediate value.

Preferably a first intermediate value is established by multiplication of the differentiated angular velocity actual value by the motor inertial torque value and a second intermediate value is determined by the motor torque value, in particular the motor torque actual value, wherein the first intermediate value and the second intermediate value are supplied to a subtractor for calculating the spring torque.

Preferably the attenuator circuit consists of at least two attenuator passages. At least one of the two attenuator passages is supplied with an integral spring torque For determining a third intermediate value, this is achieved by the established angular velocity actual value being multiplied by the motor inertial torque and subsequently being supplied to a highpass filter. In addition, for determining a fourth intermediate value, the established motor torque actual value, in particular the established motor torque actual value, is integrated without offset. To determine the integral spring torque the third and the fourth intermediate value are then supplied to a subtractor. The result is now supplied to the second attenuator passage.

Preferably the spring torque is supplied to an APC system as the attenuator connection. It can however also be supplied to any other system for attenuation.

In a preferred embodiment the attenuator circuit is embodied by at least one first attenuator passage, for establishing at least one attenuator frequency with a natural frequency for attenuating at least one load oscillation, in particular by feedback application to a predetermined angular velocity required value. Preferably the first attenuation passage, on its input side, has at least one first bandpass, which is at least supplied with the spring torque. With a bandpass the frequency bands are selected in which the attenuation is to act, in order to avoid feedback to other frequency ranges, e.g. because yet further natural frequencies are present, which can be aroused by the attenuation. I.e. a (further) bandpass then filters out the corresponding range. It has been shown that for further natural frequencies if necessary it is not the load acceleration but the load speed that must be fed back.

BRIEF DESCRIPTION OF THE DRAWING

Further features, characteristics and advantages of the present invention emerge from the description given below, which refers to the enclosed figures. In the figures, in schematic diagrams:

FIG. 6 shows a result of an example with inventive attenuation.

DETAILED DESCRIPTION OF PREFERRED EMBODIMENTS

Although the invention has been illustrated and described in greater detail by the preferred exemplary embodiments, the invention is not restricted by the disclosed examples. Variations herefrom can be derived by the person skilled in the art, without departing from the scope of the invention, as is defined by the claims given below.

Figure 1:
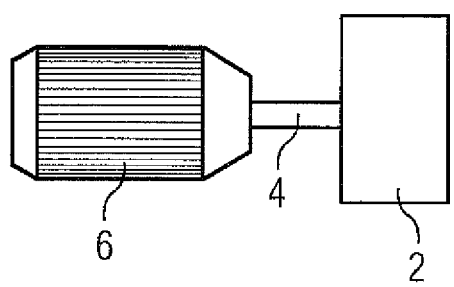
FIG. 1 shows a first drive configuration with motor and load.
Figure 2:
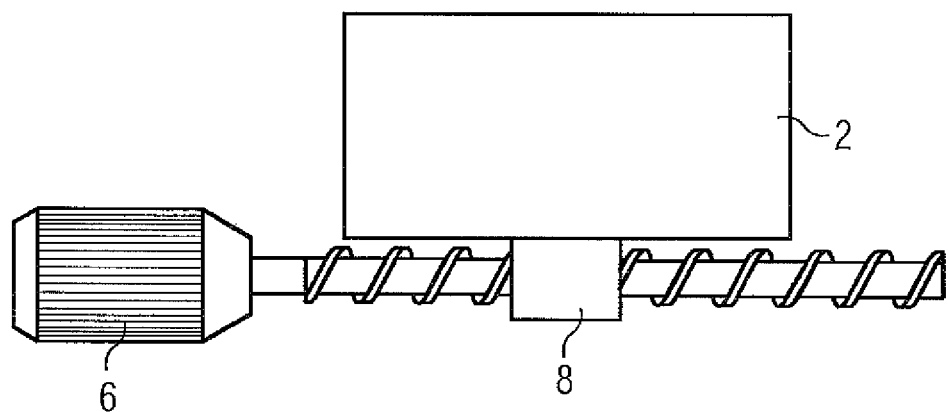
FIG. 2 shows a second drive configuration with motor and load.
Figure 3:
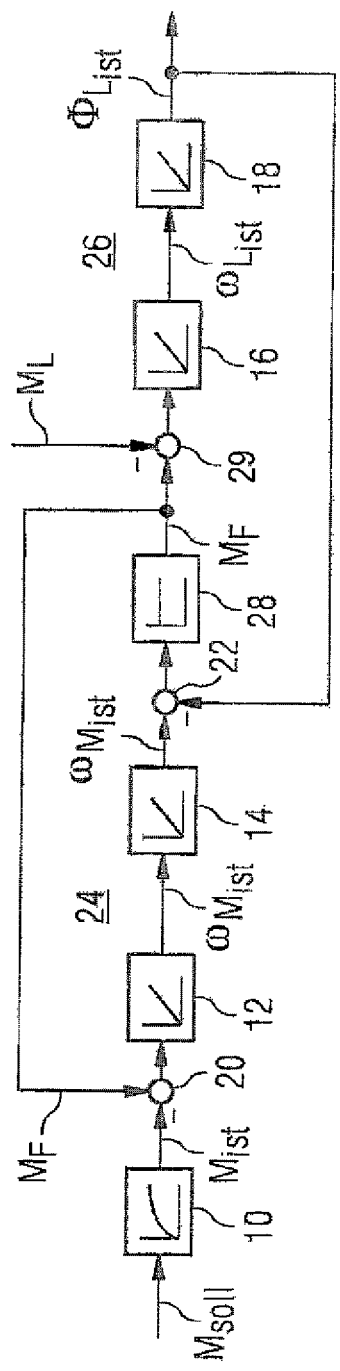
FIG. 3 shows a block diagram of a control path for a dominant natural frequency.
Figure 4:
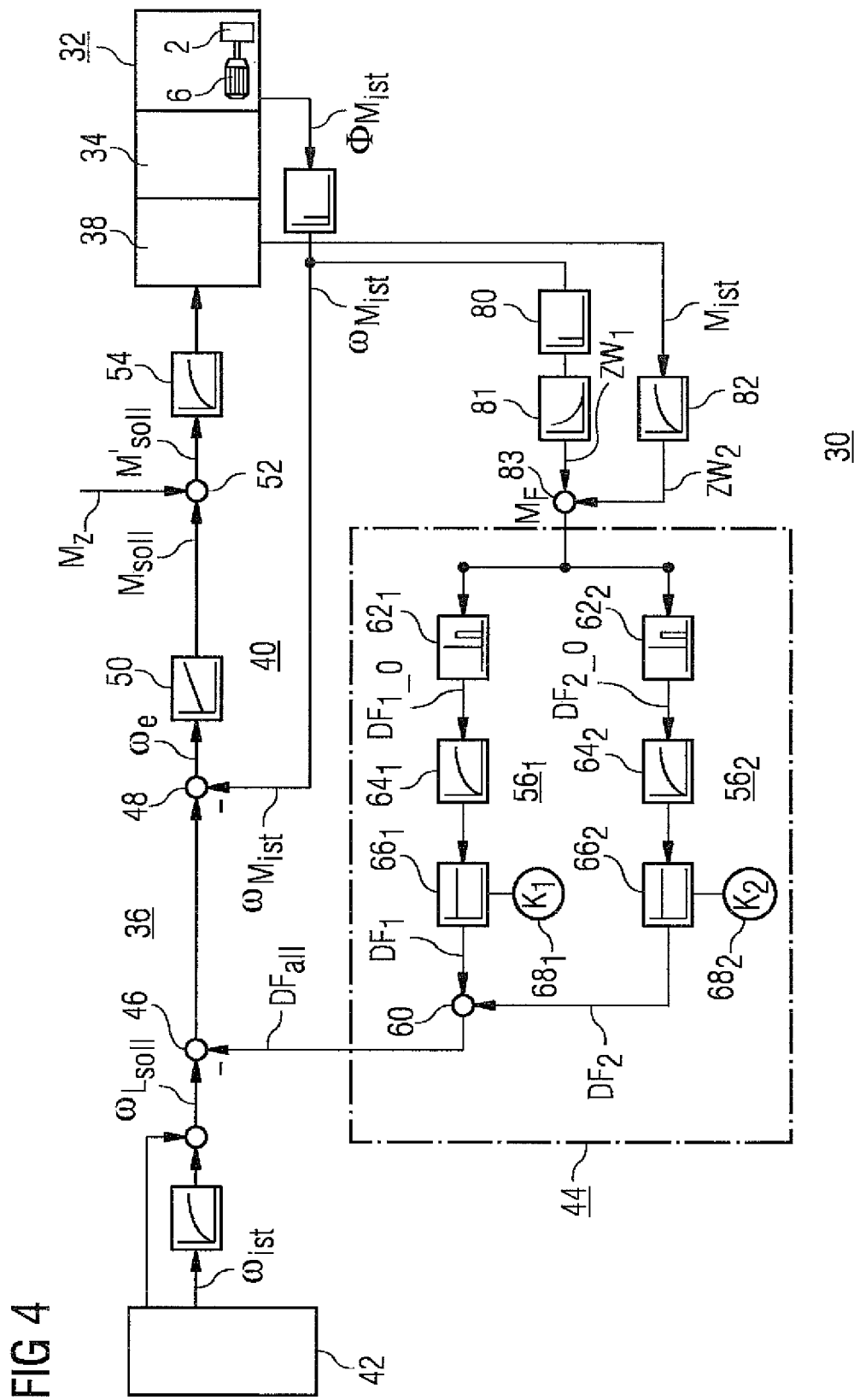
FIG. 4 shows a first graphic functional representation of a device for carrying out the inventive method in a controlled drive.

Shown in greater detail in FIG. 4 is a drive control device 30 of a controlled drive 32 with motor 6 and load 2, wherein parts of this drive control device 30 are presented in greater detail. A commercially-available drive control device 30 has a final control element 34, for example a power converter, in particular a self-commutated pulse-controlled inverter, and a closed-loop controller 36. This closed-loop controller 36 consists for example of a motor model with current controller 38, a speed control circuit 40 and a position control circuit 42. These control circuits 38,40 and 42 form a control attenuator passage. I.e. the position control circuit 42 is higher-ranking than the speed control circuit 40 and the speed control circuit 40 is higher-ranking than the motor model with current controller 38. The control circuits 38 and 42 are not specified in detail here, since these circuits are not needed for understanding the invention.

In addition this drive control device 30 has an attenuator connection 44, which is connected on its output side by means of an adder 46 to an angular velocity required value $\omega_{Lsoll}$. In this case this angular velocity required value $\omega_{Lsoll}$ is present at a non-inverting input and the attenuator connection 44 is linked on its output side to the inverting input of the adder 46. Through this the output signal $Df_{all}$ of the attenuator connection 44 is connected with negative feedback to the angular velocity required value $\omega_{Lsoll}$.

The speed control circuit 40 has on its input side a comparator 48 and on its output side a controller 50. This controller 50 is linked on its input side to an output of the comparator 48. By means of this comparator 48 a control deviation, here the deviation $\omega_e$, of an angular velocity actual value $\omega_{List}$ from a predetermined angular velocity required value $\omega_{Msoll}$ is determined. By means of the controller 50 a final control variable is created, which is characterized so that the control deviation $\omega_e$ becomes zero. Thus the angular velocity actual value $\omega_{Mist}$ is adjusted to the angular velocity required value $\omega_{Lsoll}$. With a speed control circuit 40 a motor torque required value $M_{soll}$ is obtained as a final control value of the controller 50, to which for example a noise torque $M_z$, e.g. cogging, is connected by means of an adder 52. Thus a modified motor torque required value $M_{soll}$ is present at the output of this adder 52, which is connected by means of a filter 54 to an input of the subordinate motor model with current controller 38.

On the input side, in accordance with the invention, the attenuator connection 44 is now supplied with the current spring torque $M_F$ for attenuation.

In accordance with the invention it has been recognized that the spring torque $M_F$ thus represents one of two components, which leads to load acceleration. It has been recognized in this case that the spring torque $M_F$ is produced by the following equation:

$$M_F = M_{ist} - J_M * d\omega_{Mist}/dt \quad (1)$$

wherein $\omega_{Mist}$=angular velocity actual value
$J_M$=motor inertial torque
$M_{ist}$=motor torque actual value.

The spring torque $M_F$ takes care of the acceleration of the load side. Likewise the context for the load acceleration $d\omega_{Mist}/dt$ has been recognized:

$$d\omega_{Mist}/dt + M_F - M_L \quad (2)$$

The spring torque $M_F$ thus represents one of two components, which leads to load acceleration $d\omega_{Mist}/dt$. The spring torque $M_F$ contains the portion of the load acceleration that leads to oscillation, while the load torque portion $M_L$ is normally independent of the oscillation. This enables the spring torque $M_F$ according to (1) to be included for load oscillation attenuation. Only the motor torque value, in particular the motor torque actual value $M_{ist}$, the angular velocity actual value $\omega_{Mist}$ and the motor inertial torque $J_M$ are necessary as input variables, which are usually known or are present as calculated variables or as measured variables.

A sensor or a measurement system measures the angular actual value $\Phi_{Mist}$ from which the angular velocity actual value $\omega_{Mist}$ is determined. This means that the motor speed is known. It also has been created with a generatorless motor model, so that not even a motor generator is absolutely necessary. Naturally fewer dynamic model actual values can be used just for attenuation for corresponding lower frequencies. This is now multiplied by the motor inertial torque $J_M$ by means of a multiplier 80. Subsequently the result is differentiated to form a first intermediate result $ZW_1$ differentiated according to time t (differentiator 81). Of course there can also first be differentiation according to time t and then multiplication by the motor inertial torque $J_M$, since the motor inertial torque $J_M$ is a constant.

In addition the motor torque value, in particular the motor torque actual value $M_{ist}$, is determined from the motor model with current controller 38 and from the measured current. In generatorless operation the angular velocity actual value $\omega_{Mist}$ is also determined from the motor model, but is normally delayed in relation to a measured value. This does not apply however to the motor torque value, in particular the motor torque actual value $M_{ist}$, which is present barely delayed, even in generatorless operation. This is supplied to a smoothing filter 82, i.e. a filter with a smoothing function, for forming a second intermediate value $ZW_2$. Of course all other suitable filters can be employed.

The intermediate values formed, $ZW_1$ and $ZW_2$, are now supplied to a subtractor 83. There the first intermediate value $ZW_1$ is subtracted from the second intermediate value $ZW_2$ and thereby the spring torque $M_F$ is formed. This is now supplied to the attenuator connection 44. In this case the attenuator connection 44 consists of at least one or more attenuator passages $56_1$ and $56_2$. Two attenuator passages $56_1$ and $56_2$ are shown here, which are linked on the output side by means of a further adder 60.

The attenuator passages $56_1$ or $56_2$ have a bandpass $62_1$ or $62_2$ on their input side, downstream of which a filter $64_1$ or $64_2$ is connected, and on their output side an amplifier $66_1$ or $66_2$, which is linked on its input side to an output of the filter $64_1$ or $64_2$. The amplifier $66_1$ or $66_2$ is also connected to an adjustable factor $68_1$ or $68_2$. Two natural frequencies $f_1$ and $f_2$ of the low-frequency load oscillations are to be attenuated by means of this attenuator connection 44, wherein these two natural frequencies $f_1$ and $f_2$ are to be attenuated differently, since the amplifiers $66_1$ or $66_2$ are supplied in each case with different amplification factors K1 and K2. An output signal $Df_1$ and $Df_2$ of the attenuator passages $56_1$ and $56_2$ is present at the output of each of the amplifiers $66_1$ or $66_2$. These output signals $D_{f1}$ and $D_{f2}$ of the attenuator passages $56_1$ and $56_2$ are combined by means of the adder 60 into the output signal $Df_{all}$ of the attenuator connection 44.

The low-frequency load oscillations occurring in the controlled drive 32 are measured. In this case, in the example shown, only two natural frequencies $f_1$ and $f_2$ are isolated from the low-frequency load oscillations. A bandpass filtered signal $Df_{1\_0}$ or $Df_{2\_0}$ is present at the output of the bandpass $62_1$ or $62_2$. During commissioning here at least the natural frequencies $f_1$ and $f_2$ of the low-frequency oscillations occurring are measured. On the basis of these measurements at least one bandpass $62_1$ of an attenuator passage $56_1$ of the attenuator connection 44 is adjusted so that only one natural frequency $f_1$ of the load oscillation is allowed to pass through. A bandpass filtered signal with the natural frequency $f_1$ is obtained at the output of this bandpass $61_1$. Depending on the natural frequency $f_1$ and the degree of attenuation, the amplification factor K1 is selected accordingly. The same applies for the frequency $f_2$. Through the negative-feedback connection of the output signal $Df_{all}$ of the attenuator connection 44, the natural frequency $f_1$, $f_2$ of the low-frequency load oscillation is attenuated.

The spring torque $M_F$ is created smoothed here in accordance with the invention, since a smoothing is sensible for differentiation, in order to remove the noise. With a bandpass $62_{1,2}$ the frequency ranges are selected in which the attenuation is to act, in order to avoid feedback to other frequency ranges, because for example even further natural frequencies are present, which can be aroused by the attenuation. The invention has been trialed successfully—as described in FIG. 6.

Figure 5:
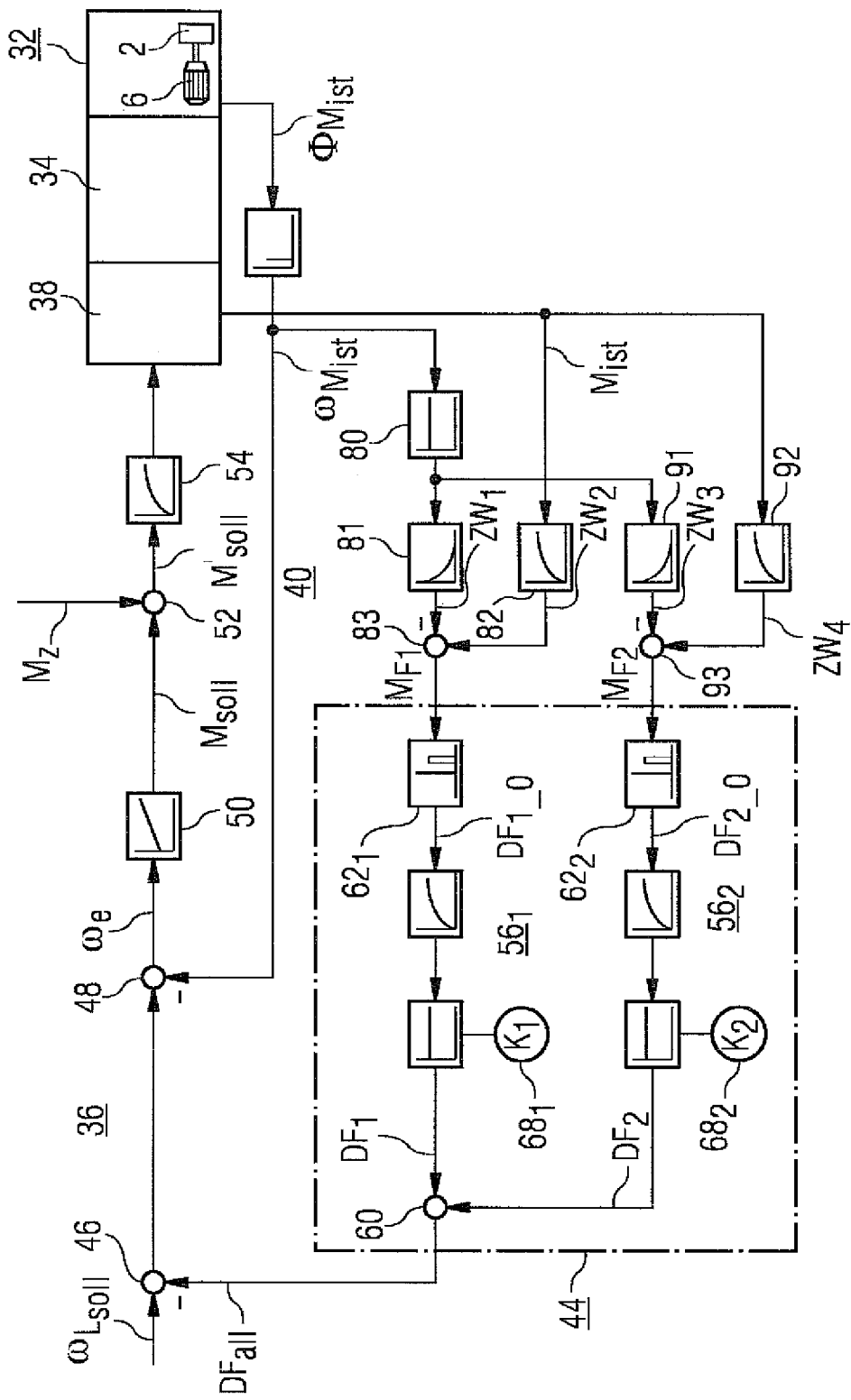
FIG. 5 shows a second graphic functional representation of a device for carrying out the inventive method in a controlled drive.

FIG. 5 shows a further exemplary embodiment. Here too the attenuator connection 44 is embodied with two attenuator passages $56_{1,2}$. The second attenuator passage $56_2$ can now be supplied not with the spring torque $M_F$ calculated above, but with the speed $\int M_F$. This is achieved in that, for determining a third intermediate value $ZW_3$, the established angular velocity actual value $\omega_{Mist}$ is multiplied by the motor inertial torque $J_M$ and is subsequently supplied to a highpass filter 91. In addition for determining a fourth intermediate value $ZW_4$, the established motor torque value, in particular of the established motor torque actual value $M_{ist}$ is integrated without offset. To determine the integral spring torque $\int M_F$ the third intermediate value $ZW_3$ and the fourth intermediate value $ZW_4$ are then supplied to a subtractor 93. This is now supplied to the second attenuator passage 44.

The second attenuator passage here therefore does not need the spring torque $M_F$ (=acceleration) but a speed, i.e. the integral of the spring torque $M_F$ with a downstream highpass. Because the differentiator and the integrator cancel each other out, the structure can also be redrafted and the smoothing during differentiation can be omitted.

FIG. 6 shows a result of a simulation of FIG. 4 with a 3-mass oscillator, wherein the lower natural frequency is to be attenuated with this method. At the beginning a speed required value jump to 10 l/s is carried out and at 0.3 s a spring-type load torque of 2 Nm is connected. The angular velocity actual value $\omega_{Mist}$ has the number 100 here. The angular velocity required value $\omega_{Lsoll}$ has the number 101 here, the signal $Df_{all}$, i.e. the attenuation connection value, has the number 102 here, the load torque $M_F$ has the number 103, the motor torque actual value $M_{ist}$ has the number 104 and the (actual) spring torque $M_F$ is calculated as 105. In the simulation the natural oscillations do not have any natural attenuation. The controller provides good attenuation both in management behavior and also in load behavior. The attenuation is also effective without changing the setting if the natural frequencies of the path change.

The advantage of this invention is that load oscillations can be attenuated without having to operate an additional measuring device. Moreover this solution, by comparison with other solutions for example, is more robust, because it only accesses existing measurement variables and the invariable motor inertial torque $J_M$. The load characteristics (spring stiffness, load inertia) no longer play any role. Naturally the path influences the natural frequency and thus also the optimum setting of the feedback amplification and of the bandpass, robust settings can be selected here however, since the attenuation effect is maintained even with a non-optimum setting, even though not quite as strong. The invention can be used in particular in conjunction with the APC system, and can also be employed with other systems.

The invention claimed is:

1. A method for attenuating load oscillations in a load mechanism having a controlled drive, wherein a load is coupled mechanically to a motor via a spring element, said method comprising:
   determining an actual motor torque value of the motor;
   determining an actual angular velocity value of the motor;
   determining a motor inertial torque;
   calculating a spring torque of the spring element by subtracting from a second intermediate value derived from the determined actual motor torque value, a first intermediate value derived from a product of the motor inertial torque and a first order time-derivative of the actual angular velocity value;
   supplying the calculated spring torque to an attenuator connection for attenuating the load oscillations; and
   attenuating the load oscillations using the calculated spring torque.

2. The method of claim 1, wherein the actual angular velocity value is derived from an actual angular position value which is measured or determined by a sensor and/or a measurement system.

3. The method of claim 1, wherein the load mechanism additionally comprises a motor model with a current controller, which is connected upstream of the controlled drive, and the method further comprising determining the motor torque value, in particular the actual motor torque value from a measured motor current and the motor model.

4. The method of claim 1, wherein the load mechanism additionally comprises a motor model with a current controller, which is connected upstream of the controlled drive, and further comprising calculating the actual angular velocity value from the motor model operating without sensors.

5. The method of claim 1, further comprising supplying the motor torque value, in particular the actual motor torque value, to a filter, in particular a smoothing filter, to form the second intermediate value.

6. The method of claim 1, wherein the attenuator connection comprises at least two attenuator passages, and further comprising:
   determining a third intermediate value by multiplying the determined actual angular velocity value with the motor inertial torque, followed by high-pass filtering;
   determining a fourth intermediate value by integrating the determined motor torque value, in particular the determined actual motor torque value, without an offset;
   determining an integral spring torque by supplying the third intermediate value and the fourth intermediate value to a second subtractor; and
   supplying the determined integral spring torque to a second of the at least two attenuator passages.

7. The method of claim 1, wherein the attenuator connection comprises an Advanced Position Control (APC) system and the calculated spring torque is supplied to the APC.

8. The method of claim 1, wherein the attenuator connection comprises at least one first attenuator passage for determining at least one attenuation frequency having a natural frequency for attenuating at least one load oscillation, in particular by way of a negative-feedback connection to a predetermined angular velocity required value.

9. The method of claim 8, further comprising supplying at least the calculated spring torque to the at least one first attenuator passage, wherein the at least one first attenuator passage has an input side with at least one first bandpass.

10. A device for attenuating load oscillations, comprising:
    a load mechanism having a controlled drive comprising a motor and a spring element, wherein a load is coupled mechanically to the motor via the spring element, said device being configured to
    determine an actual motor torque value of the motor,
    determine an actual angular velocity value of the motor,
    determine a motor inertial torque,
    calculate a spring torque of the spring element by subtracting from a second intermediate value derived form the determined actual motor torque value, a first intermediate value derived from a ;product of the motor inertial torque and a first order time-derivative of the actual angular velocity value; and
    supply the calculated spring torque to an attenuator connection for attenuating the load oscillations.

11. The device of claim 10, further comprising a sensor and/or a measurement system providing an actual angular position value, from which the actual angular velocity value is derived.

12. The device of claim 10, wherein the load mechanism additionally comprises a motor mod& with a current controller, which is connected upstream of the controlled drive, wherein the motor torque value, in particular the actual motor torque value is determined from a measured motor current and the motor model.

13. The device of claim 10, further comprising a filter, in particular a filter performing a smoothing function, which receives the motor torque value, in particular the actual motor torque value, and forms the second intermediate value.

14. The device of claim 10, wherein the attenuator connection comprises an Advanced Position Control (APC) system and wherein the calculated spring torque is supplied to the APC.

15. The device of claim 10, wherein the attenuator connection comprises at least one first attenuator passage for determining at least one attenuation frequency having a natural frequency for attenuating at least one load oscillation, in particular by way of a negative-feedback connection to a predetermined angular velocity required value.

16. The device of claim 15, wherein the at least one first attenuator passage comprises at least one first bandpass having an input side configured to receive at least the calculated spring torque.

17. The device of claim 10, wherein the load mechanism further comprises a motor model with a current controller, which is connected upstream of the controlled drive, wherein the motor model is configured to calculate the motor torque value, in particular the actual motor torque value without employing sensors.

18. The device of claim 10, wherein the attenuator connection comprises at least two attenuator passages, said device being configured to:
- determine a third intermediate value by multiplying the determined actual angular velocity value with the motor inertial torque, followed by high-pass filtering,
- determine a fourth intermediate value by integrating the determined motor torque value, in particular the determined actual motor torque value, without an offset,
- determine an integral spring torque by supplying the third intermediate value and the fourth intermediate value to a second subtractor, and
- supply the integral spring torque to a second attenuator passage.

* * * * *